US 9,133,780 B2

(12) United States Patent
Asami et al.

(10) Patent No.: US 9,133,780 B2
(45) Date of Patent: Sep. 15, 2015

(54) WORK VEHICLE AND WORK VEHICLE CONTROL METHOD

(75) Inventors: Satoshi Asami, Hiratsuka (JP); Jun Koizumi, Hadano (JP); Shotaro Ishii, Sagamihara (JP)

(73) Assignee: KOMATSU LTD., Tokyo (JP)

( * ) Notice: Subject to any disclaimer, the term of this patent is extended or adjusted under 35 U.S.C. 154(b) by 135 days.

(21) Appl. No.: 13/577,435

(22) PCT Filed: Feb. 16, 2011

(86) PCT No.: PCT/JP2011/053202
§ 371 (c)(1),
(2), (4) Date: Aug. 6, 2012

(87) PCT Pub. No.: WO2011/108353
PCT Pub. Date: Sep. 9, 2011

(65) Prior Publication Data
US 2012/0310494 A1  Dec. 6, 2012

(30) Foreign Application Priority Data
Mar. 5, 2010 (JP) ................................. 2010-048986

(51) Int. Cl.
E02F 9/20 (2006.01)
F02D 29/04 (2006.01)
B60W 10/30 (2006.01)
B60W 30/188 (2012.01)
E02F 9/22 (2006.01)
F16H 61/472 (2010.01)

(52) U.S. Cl.
CPC ............... *F02D 29/04* (2013.01); *B60W 10/30* (2013.01); *B60W 30/1886* (2013.01); *E02F 9/2246* (2013.01); *E02F 9/2253* (2013.01); *E02F 9/2289* (2013.01); *E02F 9/2292* (2013.01); *F16H 61/472* (2013.01); *Y02T 10/76* (2013.01)

(58) Field of Classification Search
CPC .................................. G06Q 10/06; E02F 9/26
USPC ............................................ 701/50; 180/65.2
See application file for complete search history.

(56) References Cited

U.S. PATENT DOCUMENTS 5,983,151 A  11/1999  Okada et al.
2006/0113140 A1  6/2006  Nakamura et al.
2006/0287841 A1*  12/2006  Hoshi et al. ................... 702/182

(Continued)

FOREIGN PATENT DOCUMENTS

CN  1166866 A  12/1997
CN  1756900 A  4/2006

(Continued)

OTHER PUBLICATIONS

International Search Report of corresponding PCT Application No. PCT/2011/053202.

(Continued)

*Primary Examiner* — Redhwan K Mawari
*Assistant Examiner* — Rodney P King
(74) *Attorney, Agent, or Firm* — Global IP Counselors, LLP

(57) ABSTRACT

A work vehicle includes a drive source, a travel device, a hydraulic pump, a work implement, a traction force detector, a lift force detector and a controller. The traction force detector is configured to detect traction force of the work vehicle. The lift force detector is configured to detect lift force for raising the work implement. The controller is configured to compare a predetermined threshold and a ratio between the lift force and the traction force, and to execute traction force reduction control for reducing the traction force when an increase in the lift force is required.

12 Claims, 12 Drawing Sheets

(56) References Cited

U.S. PATENT DOCUMENTS

2007/0010925 A1\*  1/2007  Yokoyama et al. ............ 701/50
2009/0111655 A1   4/2009  Hatanaka
2009/0240404 A1\*  9/2009  Matsuyawa .................... 701/50

FOREIGN PATENT DOCUMENTS

| CN | 101287876 A | 10/2008 |
| CN | 101341321 A | 1/2009 |
| JP | 05-106243 A | 4/1993 |
| JP | 05-106245 A | 4/1993 |
| JP | 5-106245 A | 4/1993 |
| JP | 2011-63945 A | 3/2011 |

OTHER PUBLICATIONS

The Office Action for the corresponding Chinese application No. 201180012468.7, issued on Mar. 4, 2014.

\* cited by examiner (a)

(b)

WORK VEHICLE AND WORK VEHICLE CONTROL METHOD

CROSS-REFERENCE TO RELATED APPLICATIONS

This application claims priority to Japanese Patent Application No. 2010-048986 filed on Mar. 5, 2010, the disclosure of which is hereby incorporated herein by reference in its entirety.

TECHNICAL FIELD

The present invention relates to a work vehicle and a work vehicle control method.

BACKGROUND ART

In a wheel loader or other automatic work vehicle, traction force (travel drive force) and work implement drive force are obtained from an engine as a shared drive source. For example, traction force is obtained from a so-called HST hydraulic travel device or via a torque converter. The work implement drive force is obtained via hydraulic pump driven by the engine.

In such a work vehicle, there are many cases in general practice in which travel, loading, and other work are carried out simultaneously, and it is important to distribute the output of the engine with good balance to travel and to the work implement. For example, in excavation, the vehicle is made to move forward to thereby press the work implement into a mound of soil, and the work implement 3 is raised. Soil is thereby scooped into the work implement. Therefore, it is important to balance the traction force for causing the vehicle to travel and the lift force as a work implement drive force for raising the work implement (see FIG. 14(a)). However, skill is required in order to operate the vehicle so as to capably obtain this balance. For example, when an inexperienced operator excessively depresses the accelerator and presses the work implement into the soil during excavation, the vehicle cannot move forward and comes to a stop. In this state, the traction force of the vehicle is excessively high and the lift force is reduced (see FIG. 14(b)). For this reason, the work implement cannot rise even when the work implement operation member is maximally operated. In such a state, the hydraulic circuit for feeding hydraulic fluid from the hydraulic pump to the work implement enters a relief state in order to protect the hydraulic pump. In this stalled state in which the vehicle has stopped moving, the engine output continues to be high and fuel consumption (amount of consumed fuel) is therefore increased.

In view of the above, a technique for suppressing the increase in fuel consumption has been proposed for when the vehicle is in a stalled state as described above. For example, the actuation speed of the work implement is detected in the technique disclosed in Japanese Laid-open Patent Application No. 5-106243. The engine speed is reduced until the actuation speed reaches a predetermined value when the vehicle is in a stalled state.

SUMMARY

However, the above-described prior art is control by which the engine speed is reduced after the vehicle has entered a stalled state. Accordingly, the prior art does not inhibit the vehicle from entering a stalled state in advance. Therefore, in the case of an inexperienced operator, the vehicle is readily made to stall and the engine speed is reduced on each occasion. Accordingly, ease of operation is liable to be reduced. An objective of the present invention is to provide a work vehicle and a work vehicle control method that can improve fuel consumption and suppress a reduction in ease of operation.

The work vehicle according to a first aspect of the present invention comprises a drive source, a travel device, a hydraulic pump, a work implement, traction force detector, a lift force detector, and a controller. The travel device causes the vehicle to travel by a drive force from the drive source. The hydraulic pump is driven by a drive force from the drive source. The work implement is driven by hydraulic fluid from the hydraulic pump. The traction force detector detects a traction force of the vehicle. The lift force detector detects a lift force for raising the work implement. The controller compares a predetermined threshold and a ratio of the lift force and the traction force. The controller executes traction force reduction control for reducing traction force in the case that an increase in the lift force is required.

In this work vehicle, a predetermined threshold and the ratio between the lift force and the traction force are compared, and traction force reduction control for reducing traction force is executed in the case that an increase in the lift force is required. The balance between the traction force and the lift force during work can be suitably adjusted prior to the vehicle entering a stalled state. Accordingly, the vehicle can be inhibited from entering a stalled state even in the case that an inexperienced operator operates the work vehicle. Fuel consumption can thereby be improved and a reduction in ease of operation can be inhibited.

The work vehicle according to a second aspect of the present invention is the work vehicle according to the first aspect, wherein the ratio is a ratio of the traction force with respect to the lift force. The controller reduces the traction force when the ratio is greater than the predetermined threshold in the traction force reduction control.

In this work vehicle, the ratio of the traction force with respect to the lift force is compared with a predetermined threshold, and the traction force is reduced when the ratio is greater than the predetermined threshold. For this reason, when the ratio has become greater than a predetermined threshold, the traction force is reduced so that the ratio becomes equal to or less than the predetermined threshold. The balance between the traction force and the lift force during work can be suitably adjusted prior to the vehicle entering a stalled state.

The work vehicle according to a third aspect of the present invention is the work vehicle according to the first aspect, wherein the ratio is a ratio of the lift force with respect to the traction force. The controller reduces the traction force when the ratio is less than the predetermined threshold in the traction force reduction control.

In this work vehicle, the ratio of the lift force with respect to the traction force is computed in traction force reduction control, and the traction force is reduced when the ratio is less than a predetermined threshold. For this reason, the traction force is reduced so that the ratio becomes equal to or greater than the predetermined threshold when the ratio has become less than the predetermined threshold. The balance between the traction force and the lift force during work can thereby be suitably adjusted prior to the vehicle entering a stalled state.

The work vehicle according to a fourth aspect of the present invention is the work vehicle according to the first aspect, further comprising a work implement operation member and a work implement operation detector. The work implement operation member is a member for operating the work implement. The work implement operation detector detects the amount of operation of the work implement operation member. The controller changes the predetermined threshold in accordance with the amount of operation of the work implement operation member.

In this work vehicle, the predetermined threshold is changed in accordance with the amount of operation of the work implement operation member, and it is therefore possible to inhibit the vehicle from entering a stalled state while the intent of the operator is reflected in the control of the traction force.

The work vehicle according to a fifth aspect of the present invention is the work vehicle according to the first aspect, further comprising a work implement attitude detector for detecting an attitude of the work implement. The controller changes the predetermined threshold in accordance with the attitude of the work implement.

In this work vehicle, the predetermined threshold is changes in accordance with the attitude of the work implement, and it is therefore possible to inhibit the vehicle from entering a stalled state while the actual condition of the work implement is reflected in the control of the traction force.

The work vehicle according to a sixth aspect of the present invention is the work vehicle according to the first aspect, wherein the controller determines whether the work phase of the vehicle is excavation from the state of actuation of the travel device and the work implement. Also, the controller executes the traction force reduction control when the work phase of the vehicle is determined to be excavation.

In this work vehicle, traction force reduction control is executed in the case that the work phase of the vehicle is excavation. Accordingly, it is possible to inhibit the vehicle from entering a stalled state during excavation in which a particularly high load is imposed on the vehicle.

The work vehicle according to a seventh aspect of the present invention is the work vehicle according to the first aspect, further comprising: an accelerator operation member operated by an operator; and an accelerator operation detector for detecting an amount of operation of the accelerator operation member. The controller does not execute the traction force reduction control when the amount of operation of the accelerator operation member is less than a predetermined operation amount threshold.

In this work vehicle, traction force reduction control is not executed when the amount of operation of the acceleration operation member is less than a predetermined operation amount threshold. When the amount of operation of the accelerator operation member is low, the traction force is unlikely to become excessively high in relation to the lift force. Therefore, it is possible to inhibit the traction force from being unnecessarily reduced in a state in which the vehicle will not readily enter a stalled state.

The work vehicle according to an eighth aspect of the present invention is the work vehicle according to the first aspect, further comprising a vehicle speed detector for detecting vehicle speed. The controller does not execute the traction force reduction control when the vehicle speed is greater than a predetermined speed threshold.

In this work vehicle, traction force reduction control is not executed when the vehicle speed is greater than a predetermined vehicle speed threshold. Accordingly, it is possible to inhibit a reduction in travel ability during travel in which greater drive force is required by the travel device than the work implement.

The work vehicle according to a ninth aspect of the present invention is the work vehicle according to the first aspect, further comprising a height position detector for detecting a height position of the work implement. The controller does not execute the traction force reduction control when the height position of the work implement is greater than a predetermined height threshold.

In this work vehicle, traction force reduction control is not executed when the height position of the work implement is greater than a predetermined height threshold. Accordingly, the traction force is not reduced in a state in which the work implement is lifted to a certain height and readily dislodged from a mound of soil. It is thereby possible to inhibit an unnecessary reduction in the traction force.

The work vehicle according to a tenth aspect of the present invention is the work vehicle according to the any of the first to ninth aspects, wherein the controller determines whether the hydraulic pump is in a stalled state. When the hydraulic pump is in a stalled state, the controller reduces the traction force so that the traction force assumes a fixed target value that is less than a target value for when the traction force is not reduced.

In this work vehicle, the traction force is uniformly reduced to a fixed target value that is less than a target value of when the traction force is not reduced. The vehicle can thereby rapidly escape from a stalled state when the vehicle has entered a stalled state.

The work vehicle according to an eleventh aspect of the present invention is the work vehicle according to the any of the first to ninth aspects, wherein the controller determines whether the hydraulic pump is in a stalled state. The controller does not reduce the traction force when the hydraulic pump is not in a stalled state and the work implement operation member is in a non-operation state.

In the work vehicle, the traction force is not reduced when the hydraulic pump is not in a stalled state and the work implement operation member is in a non-operation state. Accordingly, it is possible to inhibit an unnecessary reduction in traction force when hydraulic pump is not in a stalled state and the operator has no intention to actuate the work implement.

The work vehicle according to a twelfth aspect of the present invention is the work vehicle according to the fourth aspect, wherein the predetermined threshold is set so that the traction force decreases in correspondence with an increase in the amount of operation of the work implement operation member for raising the work implement.

In this work vehicle, the predetermined threshold is set so that the traction force is reduced as the amount of operation of the work implement operation member is increased. Accordingly, the traction force is reduced so that the lift force is increased as the operator increases the operation of the work implement operation member. Therefore, the intent of the operator can be reflected in the adjustment of the traction force and the lift force.

The work vehicle according to a thirteenth aspect of the present invention is the work vehicle according to the fifth aspect, wherein the work implement attitude detector detects a height position of the work implement. The predetermined threshold is set so that the traction force increases in correspondence with an increase in the height position of the work implement.

In this work vehicle, the fraction force is increased as the height position of the work implement is increased in traction force reduction control. For example, in excavation work, the amount that the lift force is reduced due to the traction force is lessened as the height position of the work implement is increased. Therefore, the vehicle is unlikely to enter a stalled state even when the traction force is increased as the height position of the work implement is increased. Also, excavation performance can be improved by increasing the traction force in a state in which the vehicle is unlikely to enter a stalled state.

The method for controlling a work vehicle according to a 14th aspect of the present invention is a method for controlling a work vehicle comprising: a drive source; a travel device for causing a vehicle to travel by a drive force from the drive source; a hydraulic pump driven by the drive force from the drive source; and a work implement driven by hydraulic fluid from the hydraulic pump. The method for controlling a work vehicle comprises the following steps: a step for detecting traction force of the vehicle; a step for detecting lift force for raising the work implement; a step for comparing a predetermined threshold and a ratio between the lift force and the traction force; and a step for executing traction force reduction control for reducing traction force in a case where an increase in lift force is required.

In this method for controlling a work vehicle, a predetermined threshold and the ratio between the lift force and the traction force are compared, and traction force reduction control for reducing traction force is executed in the case that an increase in lift force is required. The balance between the traction force and the lift force during work can be suitably adjusted prior to the vehicle entering a stalled state. Accordingly, the vehicle can be inhibited from entering a stalled state even in the case that an inexperienced operator operates the work vehicle. Fuel consumption can thereby be improved and a reduction in ease of operation can be inhibited.

In accordance with the present invention, it is possible to improve fuel consumption and to inhibit a reduction of ease of operation.

BRIEF DESCRIPTION OF THE DRAWINGS

FIG. 110 is a block view showing a schematic of the configuration of the HST work vehicle in accordance with another embodiment of the present invention.

DESCRIPTION OF EMBODIMENTS

Figure 1:
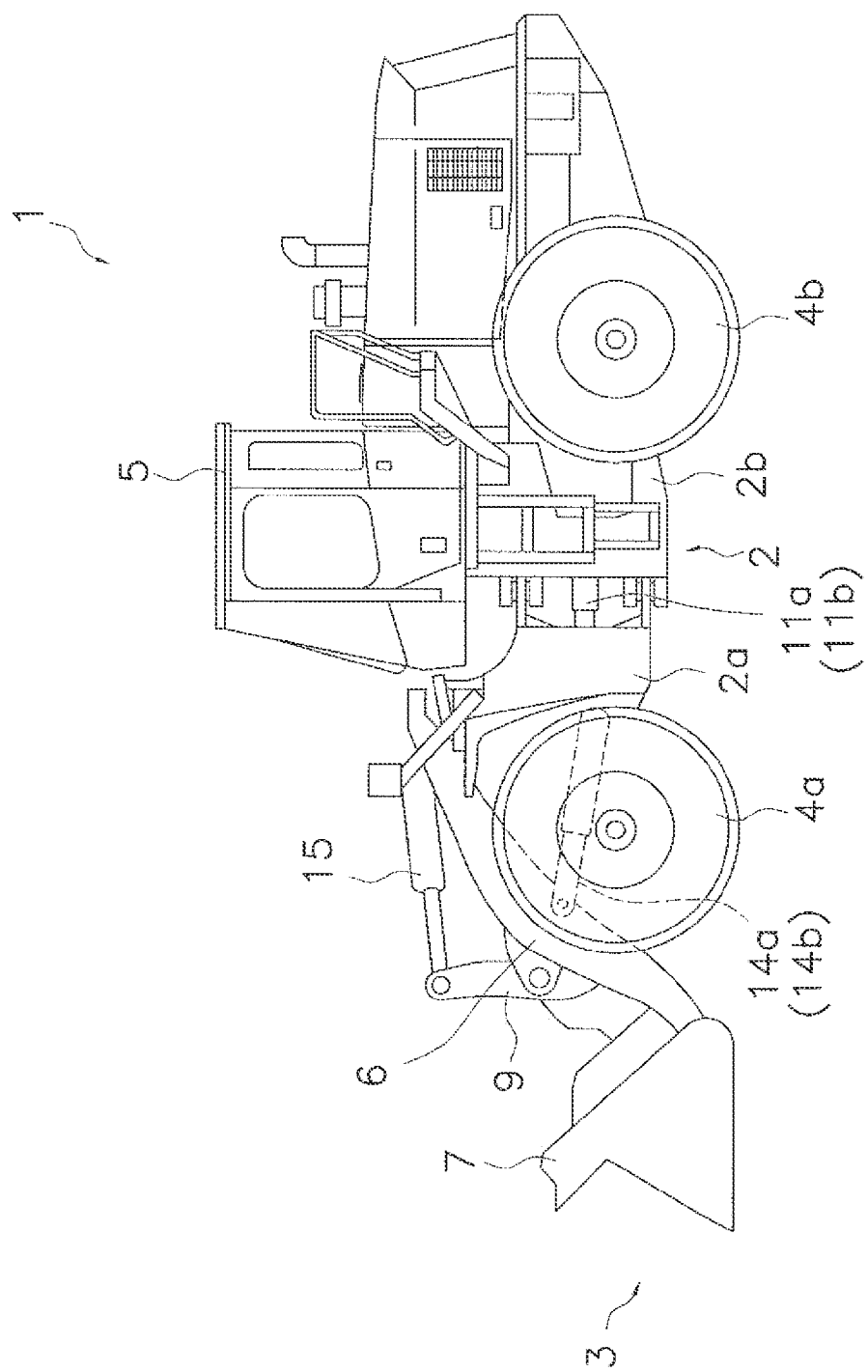
FIG. 1 is a side view of a work vehicle according to an embodiment of the present invention.
Figure 2:
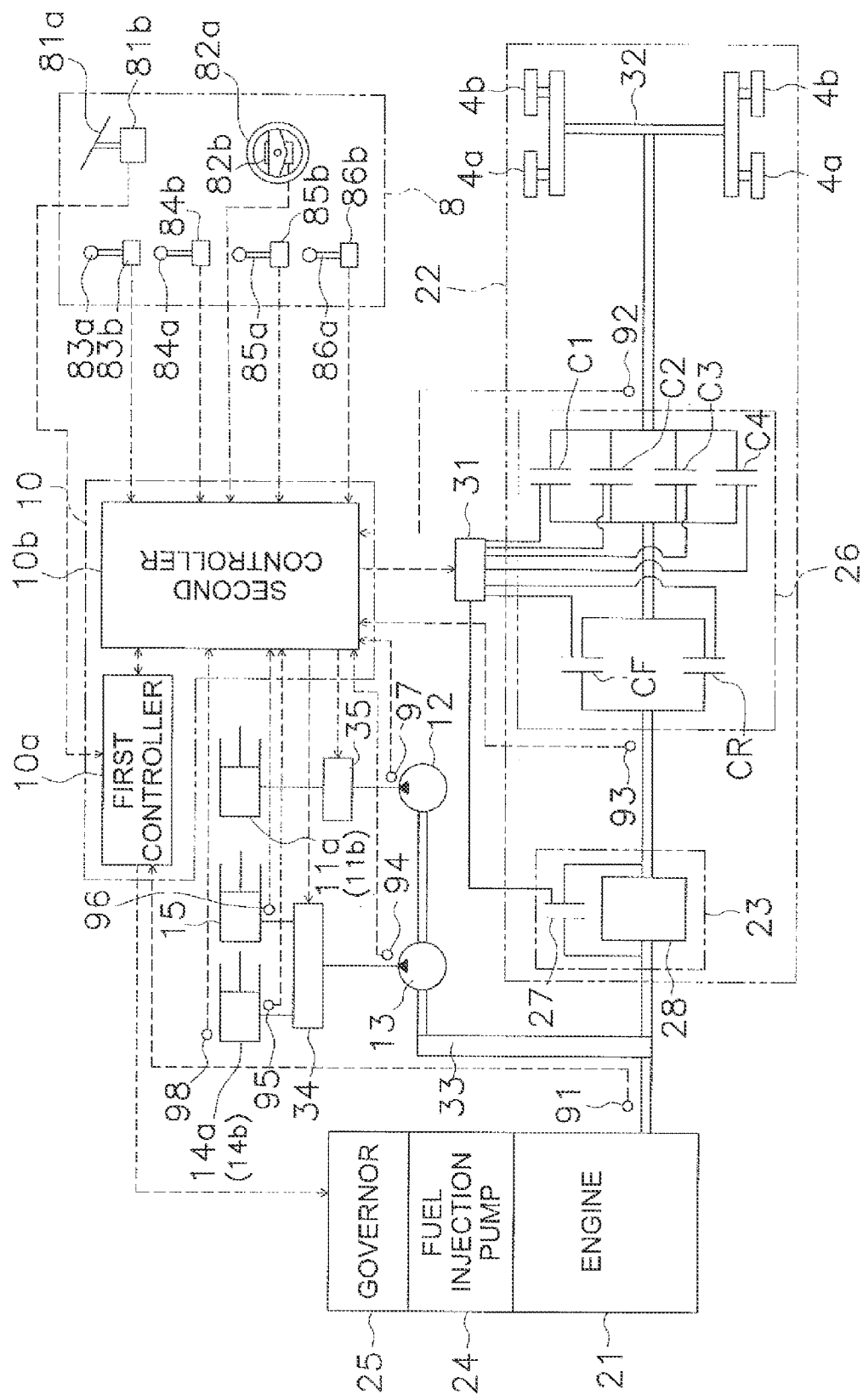
FIG. 2 is a schematic view showing the configuration of the work vehicle.

The work vehicle 1 according to an embodiment of the present invention is shown in FIGS. 1 and 2. FIG. 1 is a view of the external appearance of the work vehicle 1, and FIG. 2 is a schematic view showing the configuration of the work vehicle 1. The work vehicle 1 is a wheel loader, and the work vehicle 1 is capable of traveling by front wheels 4a and rear wheels 4b being rotatably driven, and is capable performing desired work using a work implement 3.

The work vehicle 1 comprises a vehicle body frame 2, a work implement 3, wheels 4a and 4b, and a driver cabin 5, as shown in FIG. 1.

The vehicle body frame 2 has a front vehicle body section 2a and a rear vehicle body section 2b. The front vehicle body section 2a and the rear vehicle body section 2b are connected to each other so as to allow pivoting in the left and right directions. A pair of steering cylinders 11a and 11b are provided from the front vehicle body section 2a to the rear vehicle body section 2b. The steering cylinders 11a and 11b are hydraulic cylinders driven by hydraulic fluid from a steering pump 12 (see FIG. 2). The steering cylinders 11a and 11b expand and contract, whereby the front vehicle body section 2a pivots in relation to the rear vehicle body section 2b. The direction of progress of the vehicle is thereby changed. In FIGS. 1 and 2, only one of the steering cylinders 11a and 11b is shown, and the other is omitted.

The work implement 3 and the pair of front wheels 4a are attached to the front vehicle body section 2a. The work implement 3 is driven by the hydraulic fluid from the work implement pump 13 (see FIG. 2). The work implement 3 has a boom 6, a pair of lift cylinders 14a and 14b, a bucket 7, a bell crank 9, and a bucket cylinder 15. The boom 6 is rotatably supported by the front vehicle body section 2a. One end of the lift cylinders 14a and 14b is attached to the front vehicle body section 2a. The other end of the lift cylinders 14a and 14b is attached to the boom 6. The lift cylinders 14a and 14b expand and contract by hydraulic fluid from the work implement pump 13, whereby the boom 6 vertically pivots. In FIGS. 1 and 2, only one of the lift cylinders 14a and 14b is shown, and the other is omitted. The bucket 7 is rotatably supported by the distal end of the boom 6. One end of the bucket cylinder 15 is attached to the front vehicle body section 2a. The other end of the bucket cylinder 15 is attached to the bucket 7 via the bell crank 9. The bucket cylinder 15 expands and contracts by hydraulic fluid from the work implement pump 13, whereby the bucket 7 vertically pivots.

The driver cabin 5 and the pair of rear wheels 4b are attached to the rear vehicle body section 2b. The driver cabin 5 is disposed above the vehicle body frame 2, and houses a seat on which an operator sits, a later-described operation unit 8, and the like.

The work vehicle 1 comprises an engine 21 as the drive source, a travel device 22, a work implement pump 13, a steering pump 12, an operation unit 8, a controller 10, and the like, as shown in FIG. 2.

The engine 21 is a diesel engine, and the fuel amount injected into the cylinder is adjusted to control the output of the engine 21. This adjustment is made by a later-described first controller 10a, which controls an electronic governor 25 installed in a fuel injection pump 24 of the engine 21. A general all-speed control governor is used as the governor 25, and the engine speed and fuel injection amount are adjusted in accordance with a load so that the engine speed achieves a target speed that corresponds to a later-described accelerator operation amount. In other words, the governor 25 increases or reduces the fuel injection amount so that there is no deviation between a target engine speed and the actual engine speed. The engine speed is detected by an engine speed sensor 91. The detection signal of the engine speed sensor 91 is inputted to the first controller 10a.

The travel device 22 is a device for causing the vehicle to travel by the drive force from the engine 21. The travel device 22 has a torque converter device 23, a transmission 26, the above-described front wheels 4a and rear wheels 4b, and the like.

The torque converter device 23 has a lockup clutch 27 and a torque converter 28. The lockup clutch 27 can be switched between a connected state and a non-connected state. The torque converter 28 transmits the drive force from the engine 21 using oil as a medium to the travel device 22. The input side and the output side of the torque converter 28 are directly connected when the lockup clutch 27 is in a connected state. The lockup clutch 27 is a hydraulic pressure-actuated clutch, and the feeding of hydraulic fluid to the lockup clutch 27 is controlled by a later-described second controller 10b via a clutch control valve 31 to thereby switch between the connected state and the non-connected state.

A transmission 26 has a forward clutch CF adapted for forward travel stages and a reverse clutch CR adapted for reverse travel stages. The clutches CF and CR are switched between the connected state and the non-connected state to thereby switch the vehicle between forward and reverse. The vehicle is in a neutral state when the clutches CF and CR are both in the non-connected state. The transmission 26 has a plurality of speed stage clutches C1 to C4 adapted for a plurality of speed stages, and can switch the reduction gear ratio to a plurality of stages. For example, in the transmission 26, four speed stage clutches C1 to C4 are provided, and the speed stages can be switched to four stages, i.e., first speed to fourth speed. The speed stage clutches C1 to C4 are hydraulic pressure-actuated hydraulic clutches. Hydraulic fluid is fed from a hydraulic pump (not shown) to the clutches C1 to C4 via the clutch control valve 31. The clutch control valve 31 is controlled by the second controller 10b, and the feeding of the hydraulic fluid to the clutches C1 to C4 is controlled, whereby the connected state and non-connected state of the clutches C1 to C4 are switched.

AT/M output speed sensor 92 fur detecting the speed of the output shaft of the transmission 26 is provided to the output shaft of the transmission 26. Detection signals from the T/M output speed sensor 92 are inputted to the second controller 10b. The second controller 10b calculates the vehicle speed on the basis of the detection signals of the T/M output speed sensor 92. Therefore, the T/M output speed sensor 92 functions as a vehicle speed detector for detecting the vehicle speed. A sensor for detecting the rotational speed of other components may be used as a vehicle speed detector in lieu of the output shaft of the transmission 26. The drive force outputted from the transmission 26 is transmitted to the front wheels 4a and the rear wheels 4b via a shaft 32, and the like, whereby the vehicle travels. The speed of the input shaft of the transmission 26 is detected by a T/M input speed sensor 93. The detection signals from the T/M input speed sensor 93 are inputted to the second controller 10b.

A portion of the drive force of the engine 21 is transmitted to the steering pump 12 and the work implement pump 13 via a PTO shaft 33. The work implement pump 13 and the steering pump 12 are hydraulic pumps driven by drive force from the engine 21. The hydraulic fluid discharged from the work implement pump 13 is fed to the lift cylinders 14a and 14b and the bucket cylinder 15 via a work implement control valve 34. The hydraulic fluid discharged from the steering pump 12 is fed to the steering cylinders 11a and 11b via a steering control valve 35. In this mariner, the work implement 3 is driven by a portion of the drive force from the engine 21.

The pressure of the hydraulic fluid discharged from the work implement pump 13 (hereinafter referred to as "hydraulic pressure of the work implement pump") is detected by a first hydraulic pressure sensor 94. The pressure of the hydraulic fluid fed to the lift cylinders 14a and 14b (hereinafter referred to as "hydraulic pressure of the lift cylinders") is detected by a second hydraulic pressure sensor 95. Specifically, the second hydraulic pressure sensor 95 detects the hydraulic pressure in the cylinder head chamber to which hydraulic fluid is fed when the lift cylinders 14a and 14b are extended. The pressure of the hydraulic fluid fed to the bucket cylinder 15 (hereinafter referred to as "hydraulic pressure of the bucket cylinder") is detected by a third hydraulic pressure sensor 96. Specifically, the third hydraulic pressure sensor 96 detects the hydraulic pressure of the cylinder head chamber to which hydraulic fluid is fed when the bucket cylinder 15 is extended. The pressure of the hydraulic fluid discharged from the steering pump 12 (hereinafter referred to as "hydraulic pressure of the steering pump") is detected by a fourth hydraulic pressure sensor 97. The detection signals from the first to fourth hydraulic pressure sensors 94 to 97 are inputted to the second controller 10b.

The operation unit 8 is operated by the operator. The operation unit 8 has an accelerator operation member 81a, an accelerator operation detection device 81b, a steering operation member 82a, a steering operation detection device 82b, a boom operation member 83a, a boom operation detection device 83b, a bucket operation member 84a, a bucket operation detection device 84b, a gear shift operation member 85a, a gear shift operation detection device 85b, an FR operation member 86a, an FR operation detection device 86b, and the like.

The accelerator operation member 81a is, e.g., an accelerator pedal, and is operated in order to set the target speed of the engine 21. The accelerator operation detection device 81b (accelerator operation detector) detects the operation amount of the accelerator operation member 81a (hereinafter referred to as "accelerator operation amount"). The accelerator operation detection device 81b outputs the detection signal to the first controller 10a.

The steering operation member 82a is, e.g., a steering wheel, and is operated in order to operate the direction of progress of the vehicle. The steering operation detection device 82b detects the position of the steering operation member 82a and outputs detection signals to the second controller 10b. The second controller 10b controls the steering control valve 35 on the basis of detection signals from the steering operation detection device 82b. The steering cylinders 11a and 11b thereby expand and contract, and the direction of progress of the vehicle is changed.

The boom operation member 83a and the bucket operation member 84a (work implement operation member) is, e.g., an operation lever, and is operated in order to actuate the work implement 3. Specifically, the boom operation member 83a is operated in order to actuate the boom 6. The bucket operation member 84a is operated in order to actuate the bucket 7. The boom operation detection device 83b (work implement operation detector) detects the position of the boom operation member 83a. The bucket operation detection device 84b (work implement operation detector) detects the position of the bucket operation member 84a. The boom operation detection device 83b and the bucket operation detection device 84b output detection signals to the second controller 10b. The second controller 10b controls the work implement control valve 34 on the basis of detection signals from the boom operation detection device 83b and the bucket operation detection device 84b. The lift cylinders 14a and 14b and the bucket cylinder 15 thereby expand and contract, and the boom 6 and the bucket 7 are actuated. Also, a boom angle detection device 98 for detecting the boom angle is provided to the work implement 3. The boom angle is the angle between the line that connects the center of rotational support between the front vehicle body section 2a and the boom 6 and the center of rotational support between the boom 6 and the bucket 7, and the line that connects the axial centers of the front and rear wheels 4a and 4b (see reference numerals Ab and Ab' of FIG. 13.). The boom angle is the angle Ab (positive value) in FIG. 13 when the bucket 7 is positioned on the ground surface. The boom angle changes to a small value when the bucket rises, and is the angle Ab' (negative value) when the angle is less than 0°. The boom angle can be set to 0° when the bucket 7 is positioned on the ground surface, and the reference value can be arbitrarily set. The boom angle detection device 98 outputs detection signals to the second controller 10b. The second controller 10b calculates the height position of the bucket 7 on the basis of the boom angle detected by the boom angle detection device 98. Accordingly, the boom angle detection device 98 functions as a height position detector for detecting the height of the bucket 7.

The gear shift operation member 85a is, e.g., a shift lever. The gear shift operation member 85a is operated in order to set an upper limit of the speed stage when the automatic gear shift mode has been selected. For example, in the case that the gear shift operation member 85a is set to third speed, the transmission 26 can be switched from second speed to third speed, and it is not possible to switch to fourth speed. When the manual gear shift mode is selected, the transmission 26 is switched to the speed stage set by the gear shift operation member 85a. The gear shift operation detection device 85b detects the position of the gear shift operation member 85a. The gear shift operation detection device 85b outputs the detection signals to the second controller 10b. The second controller 10b controls the gear shifting of the transmission 26 on the basis of the detection signals from the gear shift operation detection device 85b. The automatic gear shift mode and the manual gear shift mode are switched by a gear shift mode switching member (not shown) operated by the operator.

The FR operation member 86a is operated in order to switch the vehicle between forward and reverse. The FR operation member 86a can be switched to forward, neutral, and reverse positions. The FR operation detection device 86b detects the position of the FR operation member 86a. The FR operation detection device 86b outputs detection signals to the second controller 10b. The second controller 10b controls the clutch control valve 31 on the basis of the detection signals from the FR operation detection device 86b. The forward clutch CF and the reverse clutch CR are thereby controlled to switch the vehicle between forward, reverse, and neutral states.

The controller 10 has a first controller 10a and a second controller 10b. Each of the first controller 10a and the second controller 10b can be implemented in the form of a computer having a storage device used as, e.g., program memory and/or work memory, and a CPU for executing a program.

Figure 3:
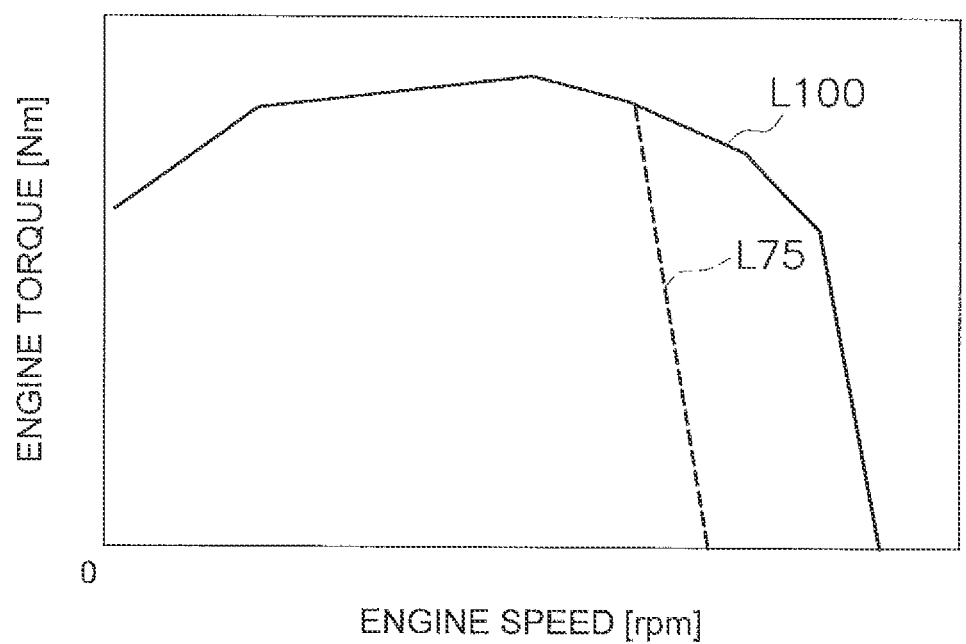
FIG. 3 is a view showing an example of the engine torque curve.

The first controller 10a sends engine command signals to the governor 25 so as to achieve a target engine speed that corresponds to the accelerator operation amount. FIG. 3 shows the engine torque curve representing a torque upper limit value that can be outputted by the engine 21 in accordance with the engine speed. In FIG. 3, the solid line L100 indicates the engine torque curve when the accelerator operation amount is 100% in a high-load work phase in which later-described traction force reduction control is not carried out. The engine torque curve corresponds to, e.g., the rated or maximum power output of the engine 21. The 100% accelerator operation amount refers to the state in which the accelerator operation member 81a is maximally operated. Also, the broken line L75 indicates the engine torque curve when the accelerator operation amount is 75% in a high-load work phase. The governor 25 controls the output of the engine 21 so that the output torque of the engine 21 (hereinafter referred to as "engine torque") becomes equal to or less than the engine torque curve. The control of the output of the engine 21 is carried out by, e.g., controlling the upper limit value of fuel injection amount to the engine 21. When the first controller 10a receives a later-described correction command signal from the second controller 10b, the first controller corrects the command value of the engine command signal using the correction command signal, and sends the corrected command value to the governor 25. The corrected command value is later described.

The second controller 10b controls the transmission 26 and/or the torque converter device 23 in accordance with the travel state of the vehicle. For example, the second controller 10b automatically switches the speed stage of the transmission 26 and switches the lockup clutch 27 in accordance with the vehicle speed when the automatic gear shift mode is selected. The second controller 10b switches the transmission 26 to the speed stage selected by the gear shift operation member 85a when the manual gear shift mode is selected.

In addition to the above-described detection signals, detection signals for the inlet pressure, the outlet pressure, and the like of the torque converter device 23 are also inputted to the second controller 10b. The first controller 10a and the second controller 10b can communicate with each other by a wireless or wired connection. The detection signals of the engine speed, the fuel injection amount, the accelerator operation amount, and the like are inputted from the first controller 10a to the second controller 10b. The second controller 10b controls the gear shifting of the transmission 26 and the actuation of the work implement 3 on the basis of various detection signals.

Figure 4:
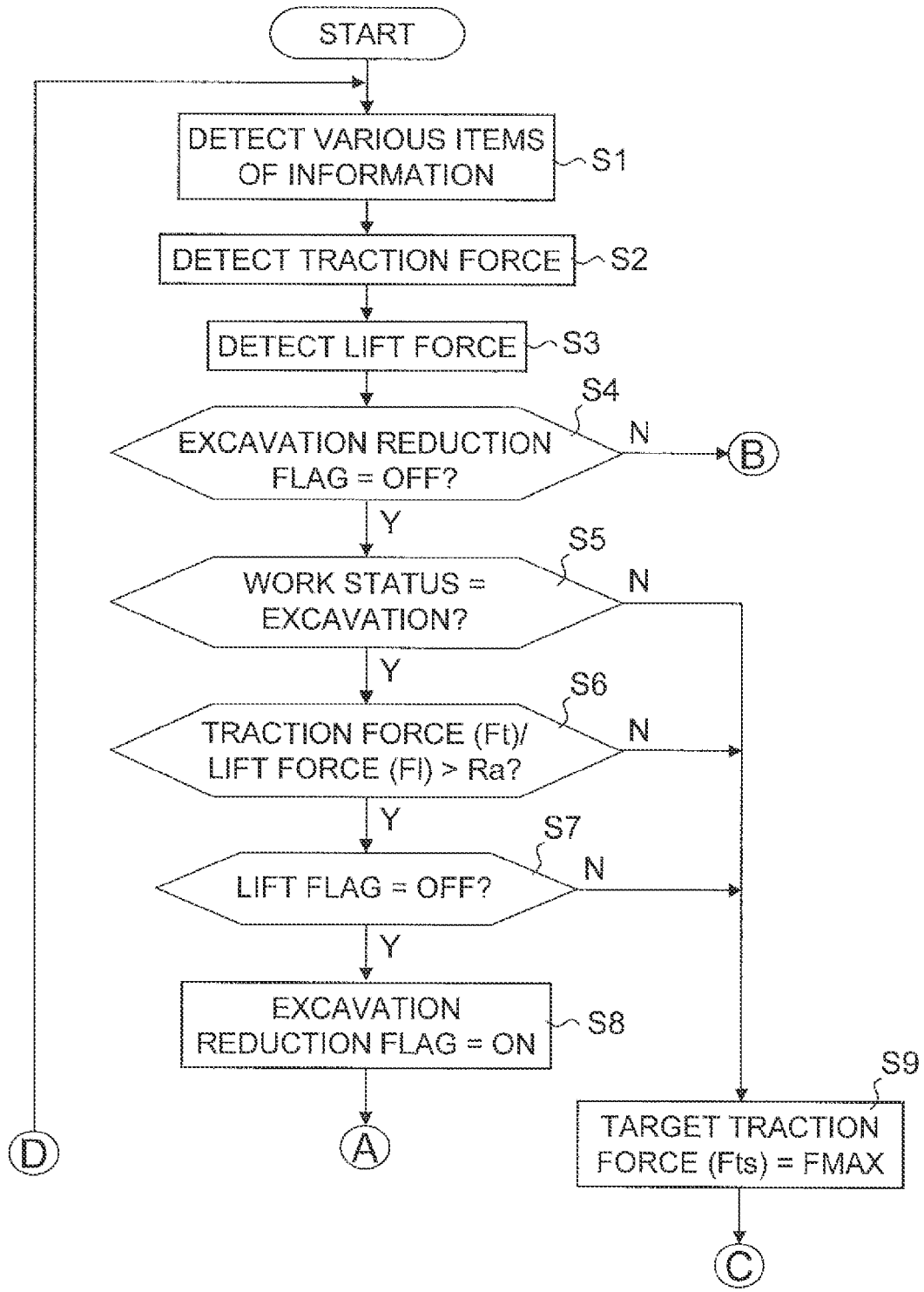
FIG. 4 is a flowchart showing the process in traction force reduction control.
Figure 5:
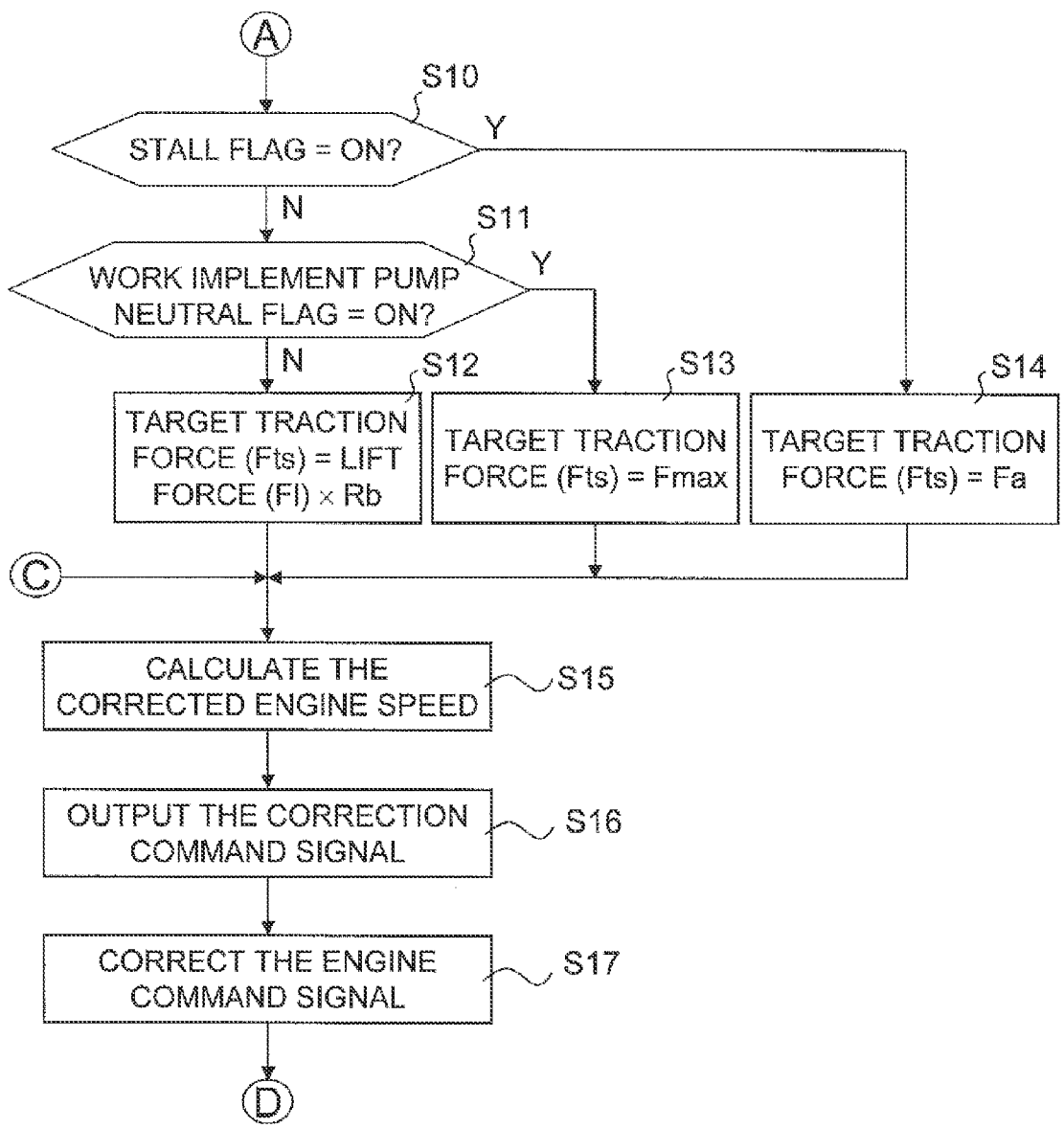
FIG. 5 is a flowchart showing the process in traction force reduction control.
Figure 6:
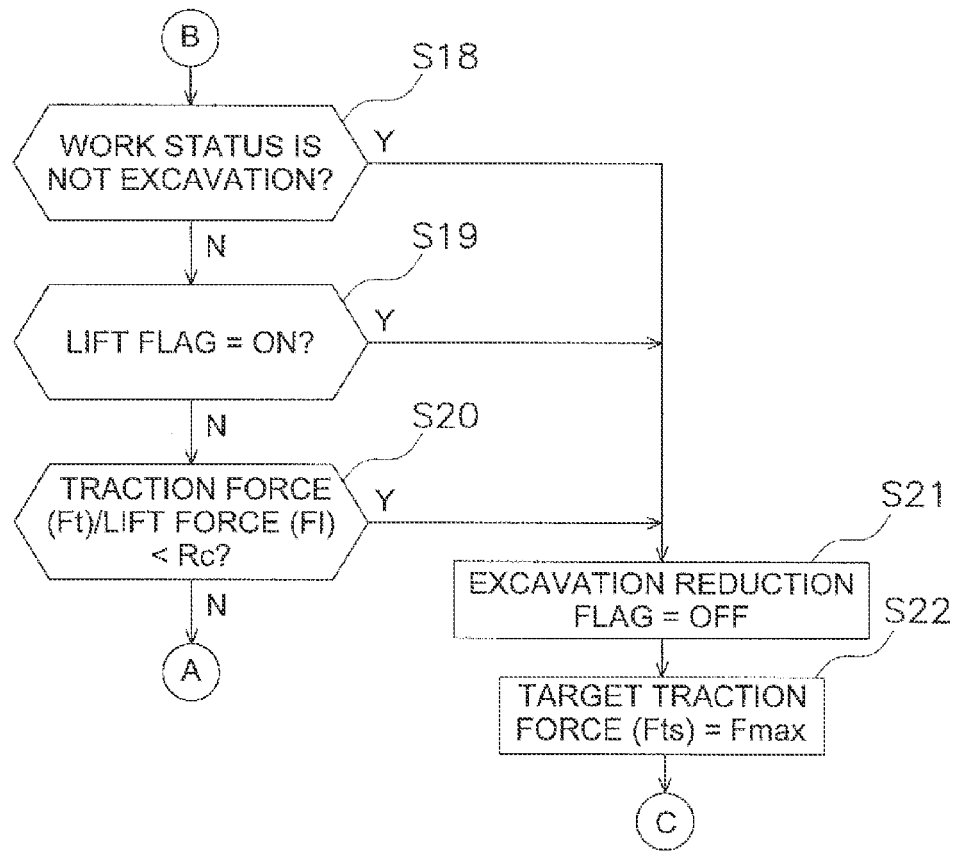
FIG. 6 is a flowchart showing the process in traction force reduction control.

The second controller 10b calculates the ratio of the traction force of the vehicle in relation to the lift force (hereinafter referred to as "excavation force ratio"). In other words, (excavation force ratio)=(traction force)/(lift force). When the excavation force ratio is greater than a predetermined threshold, the second controller 10b calculates a target traction force so that the excavation force ratio becomes less than a predetermined threshold. The second controller 10b sends a correction command signal to the first controller 10a so that the traction force becomes a target traction force. The first controller 10a corrects the engine command signal on the basis of the correction command signal and sends the result to the governor 25. The engine speed is reduced so that the excavation force ratio becomes less than the predetermined threshold. This control (traction force reduction control) is described below with reference to FIGS. 4 to 6. Excluding the 17th step S17, the process shown in the flowchart of FIGS. 4 to 6 is executed by the second controller 10b. The 17th step S17 is executed by the first controller 10a.

First, various items of information are detected in the first step S1 of FIG. 4. In this step, various items of information are sent to the second controller 10b by way of the above-described detection signals.

The traction force is detected in the second step S2. The second controller 10b calculates the traction force of the vehicle on the basis of the detected information. Specifically, the second controller 10b calculates the traction force on the basis of the speed ratio of the torque converter device 23. The speed ratio of the torque converter device 23 is calculated from the input shaft speed and the output shaft speed of the torque converter device 23. The input shaft speed of the torque converter device 23 is detected by the detection signal from the engine speed sensor 91. The output shaft speed of the torque converter device 23 is detected by the detect signal from the T/M input speed sensor 93. In other words, the engine speed sensor 91 and the T/M input speed sensor 93 constitute a traction force detector for detecting the traction force of the vehicle. More specific methods for calculating the traction force of the vehicle are known in the art and it is possible to use the methods disclosed in, e.g., Japanese Laid-open Patent Application No. H05-295760 and S60-136662.

The lift force is detected in the third step S3. The lift force is a force required for raising the bucket 7 using the boom 6. In this case, the lift force is calculated on the basis of the hydraulic pressure of the work implement pump. In other words, the first hydraulic pressure sensor 94 for detecting the above-described hydraulic pressure of the work implement pump constitutes the lift force detector for detecting the lift force.

In the fourth step S4, it is determined whether an excavation reduction flag is OFF. The excavation reduction flag is set to ON when all three execution conditions for traction force reduction control shown in the later-described fifth step S5 to the seventh step S7 are satisfied. Also, the excavation reduction flag is set to OFF when any one of the three conditions for cancelling traction force reduction control shown in the later-described 18th step S18 to the 20th step S20 are satisfied. In the case that the excavation reduction flag is OFF, the process proceeds to the fifth step S5. In the case that the excavation reduction flag is ON, the process proceeds to the 18th step S18 of FIG. 6.

In the fifth step S5, it is determined whether the work status is excavation. In this case, the second controller 10b determines whether the work status is excavation on the basis of the above-described detection signals. Specifically, it is determined that the work status is excavation when the boom angle is a predetermined excavation angle threshold or greater, the actual speed stage of the transmission 26 is first speed, and the hydraulic pressure of the lift cylinder is equal to or greater than a predetermined excavation hydraulic pressure threshold. The predetermined excavation angle threshold is set by calculating by experimentation or the like in advance the values of the possible boom angles during excavation. The predetermined excavation hydraulic pressure threshold is set by calculating by experimentation or the like in advance the values of the possible hydraulic pressures of the lift cylinder during excavation. In the case that the work status is excavation, the process proceeds to the sixth step S6. In the case that the work status is not excavation, the process proceeds to the ninth step S9.

in the sixth step S6, it is determined whether the following formula (1) has been satisfied.

$$Ft/Fl > Ra \qquad (1)$$

Figure 7:
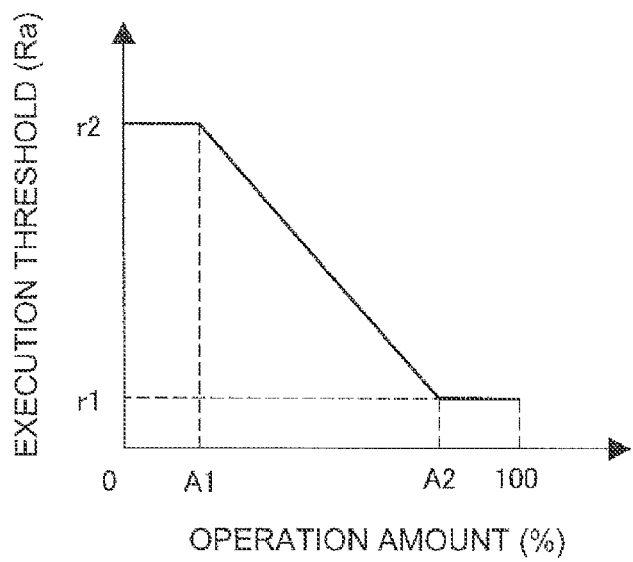
FIG. 7 is a graph showing the relationship between the execution threshold and the operation amount of the boom operation member in accordance with an embodiment of the present invention.

Ft is the current traction force detected in the second step S2. Fl is the current lift force detected in the third step S3. Ra is a predetermined execution threshold of the excavation force ratio. In other words, in this step, it is determined whether the ratio of the traction force Ft with respect to the lift force Fl (excavation force ratio) is greater than a predetermined execution threshold Ra. The predetermined execution threshold Ra is set so as to vary in accordance with the operation amount of the boom operation member 83a, as shown in FIG. 7. In other words, the execution threshold Ra is set so as to decrease as the operation amount of the boom operation member 83a is increased. The vertical axis in FIG. 7 shows the execution threshold Ra. The horizontal axis shows the operation amount of the boom operation member 83a. Percentage is used as the unit of the operation amount of the boom operation member 83a. An operation amount 0% of the boom operation member 83a indicates a neutral position in which the boom operation member 83a is not being operated. An operation amount 100% of the boom operation member 83a indicates that the boom operation member 83a is being maximally operated. In this case, the execution threshold Ra is constant at r2 when the operation amount of the boom operation member 83a is in a range of 0 or higher and less than A1. The execution threshold Ra decreases as the operation amount is increased when the operation amount of the boom operation member 83a is in a range of A1 or higher and A2 or less. The execution threshold Ra is constant at r1 when the operation amount of the boom operation member 83a is in a range of greater than A2 and 100 or less. Also, r1<r2. The value of the execution threshold Ra is set by calculating by experimentation or the like in advance the values for ensuring that the traction force does not become excessively high with respect to the lift force from the viewpoint of preventing the vehicle from entering a stalled state. In the case that the formula (1) noted above is satisfied, the process proceeds to the seventh step S7. In the case that the formula (1) is not satisfied, the process proceeds to the ninth step S9.

In the seventh step S7, it is determined whether the lift flag is OFF. The lift flag is set to OFF in the case that the boom angle is equal to or greater than a predetermined lift angle threshold. The lift flag is set to ON in the case that the boom angle is less than the predetermined lift angle threshold. The lift angle threshold is a value that is less than the above-described excavation angle threshold. The lift angle threshold is set by calculating by experimentation or the like in advance the values of the possible boom angles in the case that the vehicle is unlikely to enter a stalled state because the bucket 7 has been lifted to a certain height position. For example, the lift angle threshold is set to a boom angle at which it can be determined that the work vehicle 1 has ended the final step of excavation work and is moving to the next work, or at which it can be determined that work other than excavation is being performed. The process proceeds to the eighth step S8 in the case that the lift flag is OFF. The process proceeds to the ninth step S9 in the case that the lift flag is ON.

In the eighth step S8, the excavation reduction flag is set to ON. In other words, the excavation reduction flag is set to ON when all three execution conditions for traction force reduction control shown in the fifth step S5 to the seventh step S7 are satisfied. The process then proceeds to the tenth step S10 of FIG. 5.

On the other hand, the process proceeds to ninth step S9 when at least one of the three execution conditions for traction force reduction control shown in the fifth step S5 to the seventh step S7 is not satisfied. In the ninth step S9, the target traction force (Fts) is set to the maximum target traction force Fmax. The maximum target traction force Fmax is a traction force in a state in which the traction force reduction control is not performed. In other words, the maximum target traction force Fmax setting indicates that the traction force will not be reduced.

In the tenth step S10 to the 14th step S14 of FIG. 5, the target traction force is set in a state in which the excavation reduction flag is ON, i.e., in a state in which all three execution conditions for traction force reduction control shown in the fifth step S5 to the seventh step S7 are satisfied.

First, in the tenth step S10, it is determined whether a stall flag is set to ON. The stall flag being ON indicates that the vehicle is in a stalled state. The stall flag is set to ON when the position of the boom operation member 83a detected by the boom operation detection device 83b is equal to or greater than a predetermined boom operation threshold and the hydraulic pressure of the work implement pump is less than the hydraulic pressure of the lift cylinder. The stall flag is set to OFF when the position of the boom operation member 83a is less than a predetermined boom operation threshold or the hydraulic pressure of the work implement pump is equal to or greater than the hydraulic pressure of the lift cylinder. In the case that the stall flag is ON, the process proceeds to the 14th step S14 and the target traction force is set to a low target traction force Fa. The low target traction force is a constant value that is less than the maximum target traction force Fmax described above. For example, the low target traction force Fa is a value that is 75% or less than the maximum target traction force Fmax, and more preferably 65% or less. The engine speed is thereby more greatly reduced than when a later-described 12th step S12 is performed. This is due to the fact that the traction force must be more greatly reduced to rapidly allow the vehicle to escape from a stalled state when the stall flag is ON.

In the tenth step S10, the process proceeds to the 11th step S11 in the case that the stall flag is OFF. In the 11th step S11, it is determined whether the work implement pump neutral flag is ON. The work implement pump neutral flag is set to ON in the case that the boom operation member 83a and the bucket operation member 84a are not being operated. In other words, the work implement pump neutral flag is set to ON in the case that the boom operation member 83a and the bucket operation member 84a are positioned in the neutral position. The target traction force is set to the maximum target traction force Fmax in the 13th step S13 in the case that the work implement pump neutral flag is ON. The stalled flag being OFF indicates that the vehicle is not in a stalled state. Also, the work implement pump neutral flag being ON indicates that the operator does not immediately intend to actuate the bucket 7. It is therefore thought that there is a low possibility that the traction force will need to be reduced. Accordingly, the target traction force is set to the maximum target traction force Fmax and the traction force is not reduced in the 13th step S13.

In the case that the work implement pump neutral flag is OFF in the 11th step S11, the target traction force is set in the manner of the following formula (2).

$$Fts = Fl \times Rb \quad (2)$$

Fts is the target traction force. Fl is the current lift force detected in the third step S3. Rb is a low excavation force ratio and is set to a value that is equal to or less than a predetermined execution threshold Ra of the excavation force ratio described above. For example, the low excavation force ratio Rb is 80% or more and 100% or less than the predetermined execution threshold Ra, and more preferably 90% or more and 100% or less than the predetermined execution threshold Ra. Therefore, the target traction force in the case that the process of the 12th step S12 is performed is greater than the target traction force in the case that the process of the 14th step S14 is performed, and is equal to or less than the target traction force in the case that the 13th step S13 is performed. This is due to the fact that there is no need to reduce the traction force in comparison with the case in which the vehicle is in a stalled state because the operator intends to move the work implement and the vehicle is not in a stalled state. This is also due to the fact that the excavation force ratio can be brought to the predetermined execution threshold Ra or less so that the vehicle does not enter a stalled state.

The corrected engine speed is calculated in the 15th step S15 when the target traction force is set in the manner described above. In this case, the second controller 10b calculates the corrected engine speed for correcting the target engine speed so that the traction force is brought to the target traction force.

Next, the correction command signal is outputted in the 16th step S16. In this case, the second controller 10b transmits to the first controller 10a the correction command signal that corresponds to the corrected engine speed.

The engine speed signal is corrected in the 17th step S17. In this case, the first controller 10a corrects the engine command signal on the basis of the correction command signal. The first controller 10a sends the corrected engine command signal to the governor 25. The engine speed is thereby controlled so that the traction force is brought to the target traction force. Therefore, the engine speed is reduced so that the excavation force ratio is brought to the predetermined execution threshold Ra or less when the excavation force ratio is greater than the predetermined execution threshold Ra.

in the fourth step S4 described above, the process proceeds to the 18th step S18 of FIG. 6 in the case that the excavation reduction flag is ON. In the 18th step S18 to the 20th step S20 shown in FIG. 6, it is determined whether a condition for cancelling the traction force reduction control is satisfied.

In the 18th step S18, it is determined whether the work status is not excavation. In this case, it is determined that the work status is not excavation in the case that the condition for excavation of the fifth step S5 described above is not satisfied. The process proceeds to 21st step S21 in the case that the work status is not excavation.

In the 21st step S21, the excavation reduction flag is changed to OFF. In the 22nd step S22, the target traction force is set to the maximum target traction force Fmax. The process thereafter proceeds to the 15th step S15 described above.

On the other hand, in the 18th step S18, the process proceeds to the 19th step S19 in the case that the work status is excavation. In the 19th step S19, it is determined whether the lift flag is ON. In this case, the determination is made on the basis of the condition of the lift flag of the seventh step S7 described above. In the case that the lift flag is ON, the process proceeds to the 21st step S21 and the same process as that described above is performed.

In the 19th step S19, the process proceeds to the 20th step S20 in the case that the lift flag is OFF. In the 20th step S20, it is determined whether the following formula (3) is satisfied.

$$Ft/Fl < Rc \quad (3)$$

Ft is the current traction force detected in the second step S2. Fl is the current lift force detected in the third step S3. Rc is a predetermined cancellation threshold of the excavation force ratio, and is a value that is equal to or less than the execution threshold Ra described above. In the case that the formula (3) is satisfied, the process proceeds to the 21st step S21 and the same process as that described above is performed.

The process proceeds to the tenth step S10 of FIG. 5 in the case that the formula (3) is not satisfied in the 20th step S20. In other words, the excavation reduction flag is kept ON and the process proceeds to the tenth step S10 when none of the conditions for cancelling the traction force reduction control shown in the 18th step S18 to the 20th step S20 are satisfied. Conversely, the excavation reduction flag is changed to OFF and the process proceeds to the 15th step S15 in the case that at least one condition for cancelling the traction force reduction control is satisfied.

The process described above is constantly repeated while the engine 21 is being driven. Accordingly, the target traction force is modified in accordance with variation in any of the conditions described above.

In the work vehicle 1 according to an embodiment of the present invention, the excavation force ratio is calculated in the manner described above and compared with the predetermined execution threshold Ra. Traction force reduction control for reducing the engine speed is executed when the excavation force ratio is greater than the execution threshold Ra. Accordingly, the engine speed is reduced so that the excavation force ratio is brought to the predetermined execution threshold Ra or less when the excavation force ratio has become greater than the predetermined execution threshold Ra. In other words, the traction force is reduced so that the excavation force ratio is brought to the predetermined execution threshold Ra or less. It is thereby possible to suitably adjust the balance of the traction force and the lift force during excavation before the vehicle enters a stalled state. Accordingly, the vehicle can be inhibited from entering a stalled state even in the case that an inexperienced operator operates the work vehicle. Since the execution threshold Ra is reduced as the operation amount of the boom operation member 83a is increased, the traction force is set to be less than the target traction force as the operator more greatly operates the boom operation member 83a. In other words, the amount of reduction in the traction force is increased as the operator more greatly operates the boom operation member 83a. The traction force is thereby reduced, whereby lift force can be increased. Also, the intention of the operator is reflected in the control of the traction force. Fuel consumption can thereby be improved and a reduction in ease of operation can be inhibited.

The traction force reduction control is executed in the case that the work phase of the vehicle is excavation. Accordingly, the vehicle can be inhibited from entering a stalled state during excavation in which a particularly high load is imposed on the vehicle. The work vehicle 1 is inhibited from entering a stalled state, whereby the time for excavation work can be reduced. Since excavation work is work that entails high fuel consumption, it is possible to improve filet consumption and to achieve a reduction in $CO_2$ emissions by reducing the time for excavation work.

The traction force reduction control is not executed when the boom angle is greater than a predetermined lift angle threshold. In other words, the traction force reduction control is not executed when the position of the bucket 7 is higher than the predetermined height threshold that corresponds to the lift angle threshold. Accordingly, the engine speed is not reduced in a state in which the bucket 7 has been lifted and is readily dislodged from a mound of soil. It is thereby possible to inhibit an unnecessary reduction in the engine speed.

The target traction force is set to the low target traction force Fa when the stall flag is ON as in the tenth step S10 and the 14th step S14 described above. In other words, in traction force reduction control, the target traction force is uniformly reduced to a constant value that is less than the maximum target traction force when the work implement pump 13 is in a stalled state. The vehicle can thereby be rapidly allowed to escape from the stalled state.

The target traction force is set to the maximum target traction force Fmax when the stall flag is OFF and the work implement pump neutral flag is ON, as in the above-described tenth step S10, 11th step S11, and 13th step S13. In other words, the target traction force is set to the maximum target traction force in traction force reduction control when the work implement pump 13 is not in a stalled state and the boom operation member 83a and the bucket operation member 84a are both in a state of non-operation. Accordingly, it is possible to inhibit an unnecessary reduction in the engine speed.

An embodiment of the present invention was described above, but the present invention is not limited to the above-described embodiment, and various modifications are possible within a range that does not depart from the spirit of the invention.

Figure 8:
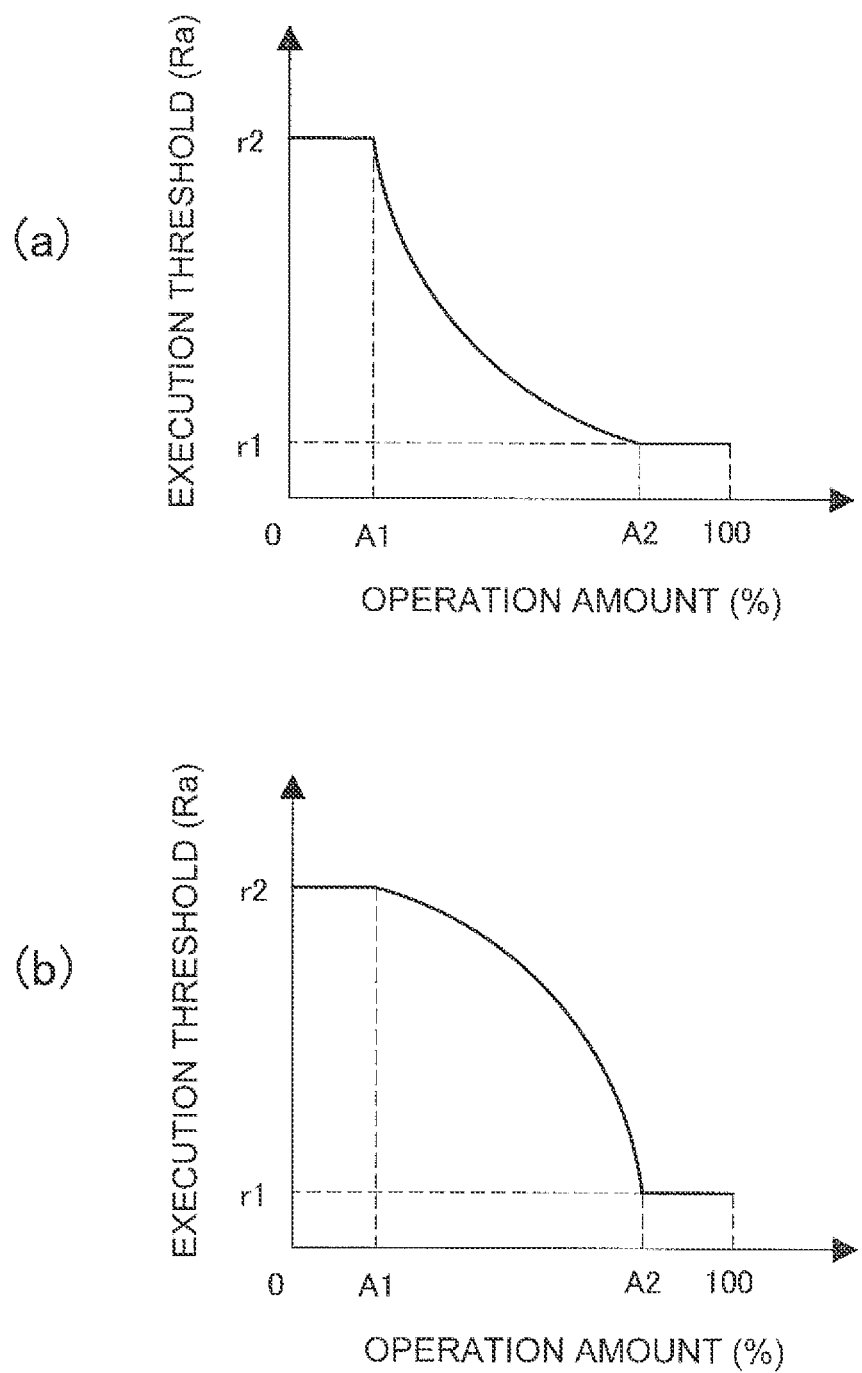
FIG. 8 is a graph showing the relationship between the execution threshold and the operation amount of the boom operation member in accordance with another embodiment of the present invention.

Variation in the execution threshold Ra with respect to the operation amount of the boom operation member 83a is not required to be rectilinear as in FIG. 7. For example, variation in the execution threshold Ra with respect to the operation amount of the boom operation member 83a may be curved, as shown in FIG. 8(a) and FIG. 8(b).

The execution threshold Ra may be allowed to be set by the operator. For example, a threshold-setting member may provide to the operation unit 8 and the second controller 10b may set the value of the execution threshold Ra in accordance with the position of the threshold-setting member. The threshold-setting member may be a touch panel monitor, a dial, or the like. Also, the threshold-setting member may be a switch provided to the boom operation member 83a.

It is also possible for a process to be executed in which the second controller 10b does not execute traction force reduction control when the accelerator operation amount is less than a predetermined operation amount threshold. The value of the predetermined operation amount threshold is set to a sufficiently low level at which it is predicted that the vehicle will not enter a stalled state even when the accelerator operation amount is kept at the operation amount threshold thereof. It is thereby possible to inhibit an unnecessary reduction in the engine speed.

It is also possible to add to the above-described flowchart a process in which the second controller 10b does not execute a traction force reduction control when the vehicle speed is greater than a predetermined vehicle speed threshold. A value that allows the vehicle to be deemed to be traveling is set as the predetermined vehicle speed. It is common that a greater drive force is greater required for the travel device 22 than the work implement 3 when the vehicle is traveling. It is therefore possible to inhibit a reduction in travel ability.

The excavation determination conditions are not limited to those described above, and other conditions may be used. For example, no limitation is imposed to the case in which the speed stage of the transmission 26 is first speed, the work phase may be determined to be excavation in the case in which the speed stage is second speed. In the embodiment described above, the excavation work phase is shown as an example in which traction force reduction control is executed because excavation is typically high-load work for the work vehicle, but traction force reduction control may be executed when high-load work other than excavation is being performed.

Figure 9:
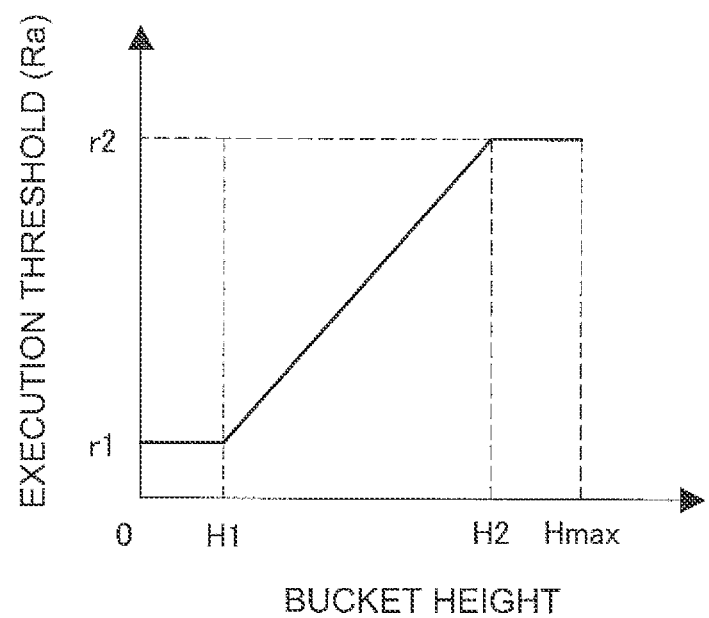
FIG. 9 is a graph showing the relationship between the execution threshold and the height position of the bucket in accordance with another embodiment of the present invention.

In the embodiment described above, the execution threshold Ra is modified in accordance with the operation amount of the boom operation member 83a, but may be modified in accordance with the attitude of the work implement 3. For example, the execution threshold Ra may be set so that the traction force is increased as the height position of the bucket 7 is increased. Specifically, the execution threshold Ra may be modified so as to increase as the height position of the bucket 7 is increased, as shown in FIG. 9. The vertical axis in FIG. 9 shows the execution threshold Ra. The horizontal axis shows the height of the bucket 7. In this case, the amount by which the traction force is reduced in traction force reduction control is inhibited so that the traction force is increased as the height position of the bucket 7 is increased. Due to the structure of the work implement 3 in a wheel loader, the amount of reduction in the lift force due to the traction force decreases as the height position of the bucket 7 is increased. Accordingly, the work vehicle 1 is unlikely to enter a stalled state even when the traction force is increased as the height position of the bucket 7 is increased. The traction force is increased, whereby the engine speed performance is improved. Also, the work vehicle 1 may perform work in which scattered snow, crushed stone, or the like is gathered up into a small mound in preparation for the next dumping work. At this time, the work vehicle 1 gradually raises the bucket 7 to push the crush stone or the like upward while ascending the sloped surface of the small mound. Accordingly, a greater traction force is required as the height position of the bucket 7 is increased. In view of this situation, the execution threshold Ra is set in the manner described above so that the traction force is increased as the height position of the bucket 7 is increased, whereby the ease of operation can be improved. The traction force is gradually increased as the height position of the bucket 7 is increased, whereby a traction force suitable for the operation conditions of the work implement 3 can be obtained. The height of the bucket 7 can be obtained from the boom angle described above. Therefore, the boom angle detection device 98 described above functions as a work implement attitude detector for detecting the height position of the bucket 7. Also, the execution threshold Ra may be modified in accordance with the angle of the bucket 7 in addition to the height position of the bucket 7. In this case, the direction of the tip of the bucket 7 with respect to the horizontal direction is detected as the angle of the bucket 7. Alternatively, the execution threshold Ra may be modified in accordance with the height position of the bucket 7 when the angle of the bucket 7 is not an angle at which the bottom surface of the bucket 7 is horizontal.

In the work vehicle according to the embodiment described above, a first controller 10a and a second controller 10b are separately provided, but these may be integrally provided. For example, the functions of first controller 10a and the second controller 10b may be implemented by a single computer. Conversely, the functions of the first controller 10a or the second controller 10b may be shared by a plurality of computers.

Figure 10:
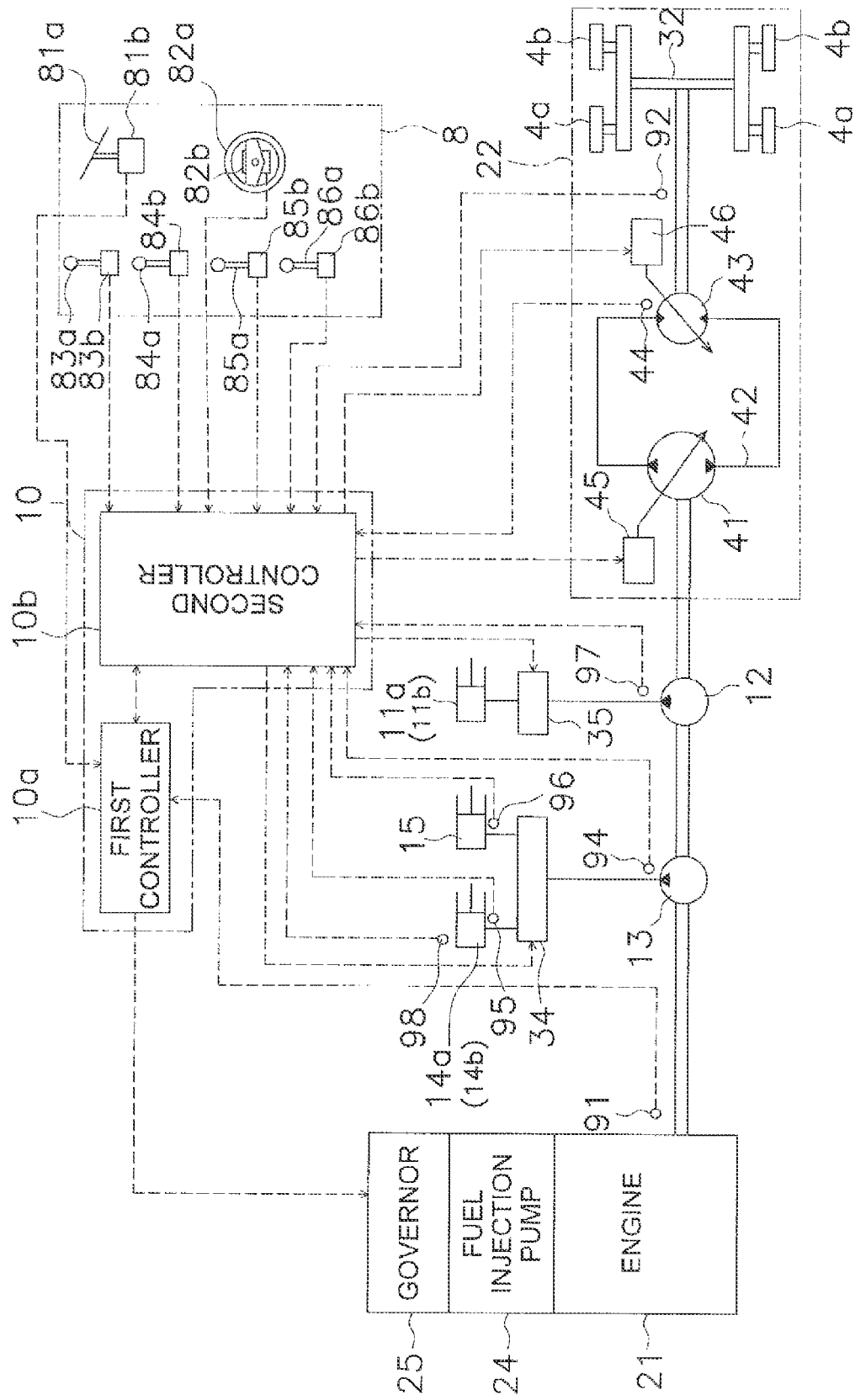

The work vehicle to which the present invention is applied is not limited to that described above. For example, the present invention may also be applied to work vehicles other than a wheel loader, including backhoe loaders, skid steer loaders, telescopic handlers, and crawler-type loaders. Also, the present invention may be applied to a work vehicle (hereinafter referred to as a "HST work vehicle") provided with a hydraulic static transmission (HST). In an HST work vehicle, a hydraulic pump 41 for travel is driven by the drive force from the engine 21, and the hydraulic fluid discharged from the hydraulic pump 41 fire travel is fed to a hydraulic motor 43 via a travel circuit 42, as shown in FIG. 10. The hydraulic motor 43 is thereby driven, and the wheels 4a and 4b are driven by the rotational force of the hydraulic motor 43. The pressure of the hydraulic fluid fed to the hydraulic motor 43 (hereinafter referred to as "travel circuit hydraulic pressure") is detected by a travel circuit hydraulic pressure sensor 44. Also, a pump displacement controller 45 is provided for adjusting the tilt angle of the hydraulic pump 41 for travel in accordance with a control signal from the second controller 10b. The second controller 10b controls the pump displacement controller 45, whereby the displacement of the hydraulic pump 41 for travel can be electrically controlled. Also, a motor displacement controller 46 is provided for adjusting the tilt angle of the hydraulic motor 43 in accordance with a control signal from the second controller 10b. The second controller 10b controls the motor displacement controller 46, whereby the displacement of the hydraulic motor 43 can be electrically controlled. In FIG. 10, the same reference numerals are used for the same constituent elements of FIG. 2.

Figure 11:
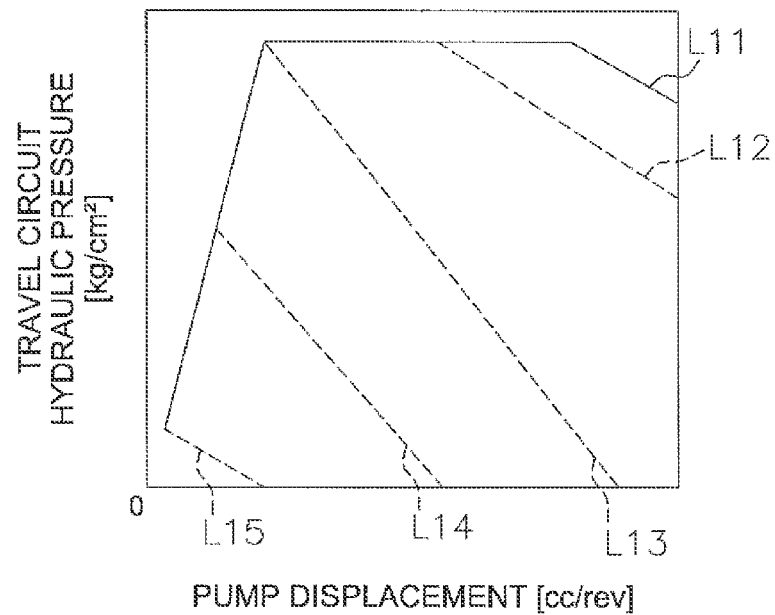
FIG. 11 shows an example of the pump displacement in relation to the travel circuit hydraulic characteristics in an HST work vehicle.

The second controller 10b processes output signals from the engine speed sensor 91 and the travel circuit hydraulic pressure sensor 44, and outputs command signals for the pump displacement to the pump displacement controller 45. In this case, the second controller 10b refers to the pump displacement/travel circuit hydraulic pressure characteristics data stored in the second controller 10b, sets the pump displacement from the value of the engine speed and the value of the travel circuit hydraulic pressure, and outputs to the pump displacement controller 45 the pump displacement command value that corresponds to the pump displacement thus set. FIG. 11 shows an example of the pump displacement circuit hydraulic pressure characteristics data. The solid line L11 and the broken lines L12 to L15 in the drawing are lines showing the pump displacement/travel circuit hydraulic pressure characteristics data modified in accordance with the engine speed. The pump displacement controller 45 modifies the tilt angle of the hydraulic pump 41 for travel on the basis of an inputted pump displacement command value. The pump displacement is thereby brought to a level that corresponds to the engine speed.

Figure 12:
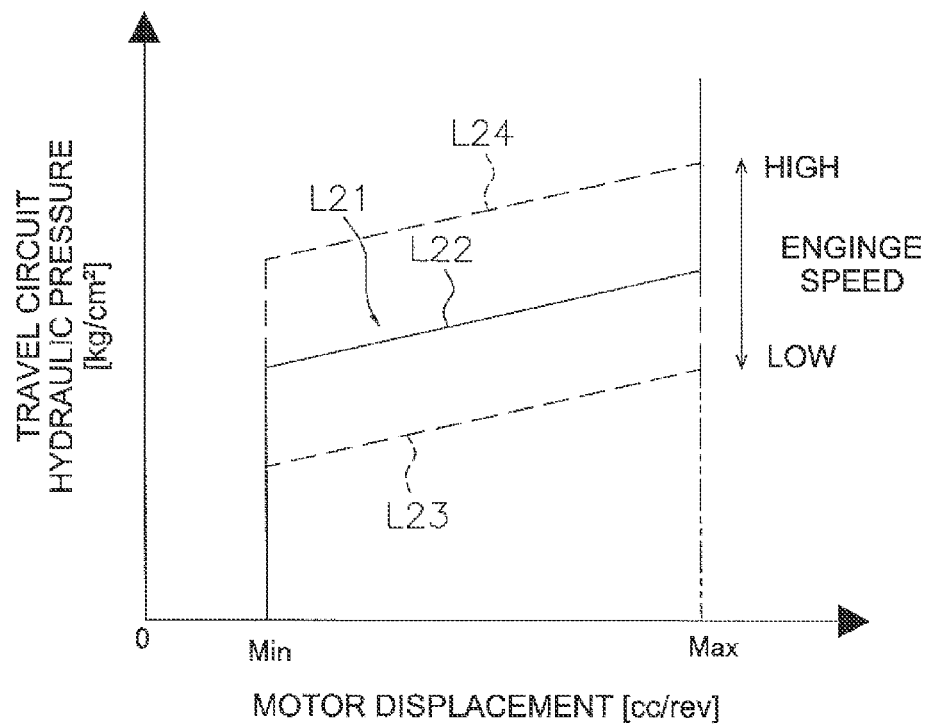
FIG. 12 shows an example of the motor displacement in relation to the travel circuit hydraulic characteristics in an HST work vehicle.

The second controller 10b processes output signals from the engine speed sensor 91 and the travel circuit hydraulic pressure sensor 44, and outputs command signals for the motor displacement to the motor displacement controller 46. In this case, the second controller 10b refers to the motor displacement/travel circuit hydraulic pressure characteristics data stored in the second controller 10b, sets the motor displacement from the value of the engine speed and the value of the travel circuit hydraulic pressure, and outputs to the motor displacement controller 46 the motor displacement command value that corresponds to the motor displacement thus set. FIG. 12 shows an example of the motor displacement/travel circuit hydraulic pressure characteristics data. The solid line L21 in the drawing is a line with an established tilt angle with respect to the travel circuit hydraulic pressure in a state in which the engine speed is in a certain state. The tilt angle is at minimum (Min) until the travel circuit hydraulic pressure is equal to or less than a certain constant value. The tilt angle also gradually increases thereafter in accompaniment with the increase in travel circuit hydraulic pressure (the solid sloped portion L22). The tilt angle reaches maximum (Max) and the tilt angle then stays at the maximum tilt angle Max even when the hydraulic pressure increases. The solid sloped portion L22 noted above is set so as to rise and fall in accordance with the engine speed. In other words, when the engine speed is low, the tilt angle increases from a state in which the travel circuit hydraulic pressure is lower, and the travel circuit hydraulic pressure is controlled so as to reach the maximum tilt angle in a state in which the travel circuit hydraulic pressure is lower (see the sloped portion L23 in the lower broken line of FIG. 12). Conversely, when the engine speed is high, the minimum tilt angle Min is maintained until the travel circuit hydraulic pressure becomes higher, and the travel circuit hydraulic pressure is controlled so as to reach the maximum tilt angle Max in a state in which the travel circuit hydraulic pressure is higher (see the sloped portion L24 in the upper broken line of FIG. 12)

The HST work vehicle comprises the same gear shift operation member 85a as that of the work vehicle 1 according to the embodiment described above. The second controller 10b stores the maximum vehicle speed that corresponds to each speed stage selected by the gear shift operation member 85a. The second controller 10b controls the motor displacement controller 46 so that the vehicle speed does not exceed the maximum speed for the selected speed stage. The same gear shift control as that of the work vehicle according to the embodiment described above is thereby performed. In this HST work vehicle, the same control of the engine 21 as that of the work vehicle 1 according to the embodiment described above is performed by the first controller 10a. Also, in this HST work vehicle, a controller 10 performs traction force reduction control in the same manner as described above. However, means for reducing the traction force is not limited to reducing the engine speed in the manner of the embodiment described above. For example, the traction force may also be reduced by increasing the motor displacement, controlling the pump displacement so that the travel circuit hydraulic pressure is reduced, or using other means.

The present invention may be applied to a work vehicle comprising a hydraulic mechanical transmission (HMT). In this case as well, the traction force may be reduced by reducing the engine speed, controlling the motor displacement, controlling the pump displacement, controlling the gear ratio, or using other means, in the same manner as a HST work vehicle.

In the embodiment described above, an engine is used as the drive source, but another device may be used. For example, in the case that an electric motor is used, the traction force may be reduced by controlling the drive torque of the electric motor. Specifically, the electric power, electric current, or voltage fed to the electric motor may be controlled, whereby the traction force is controlled.

Figure 13:
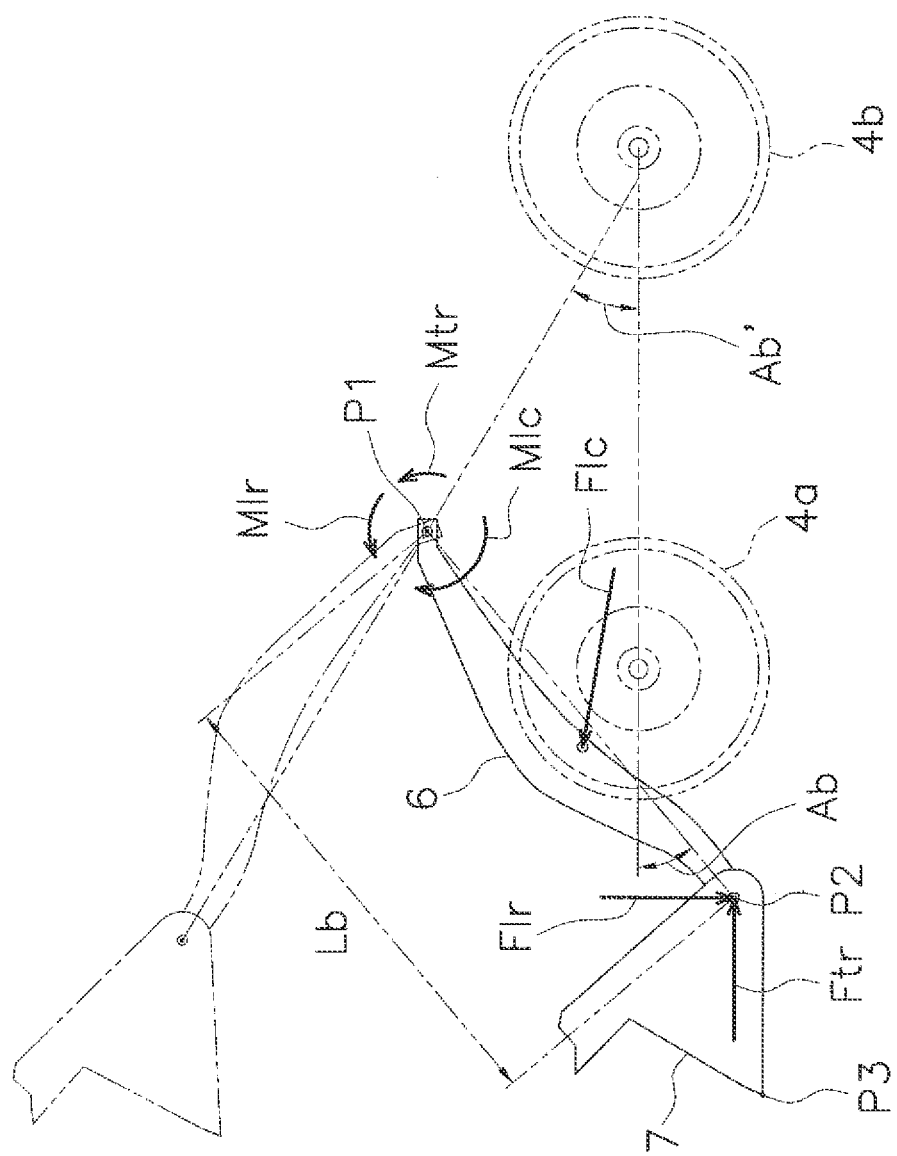
FIG. 13 shows the parameters of the method for calculating the lift force in accordance with another embodiment of the present invention.
Figure 14:
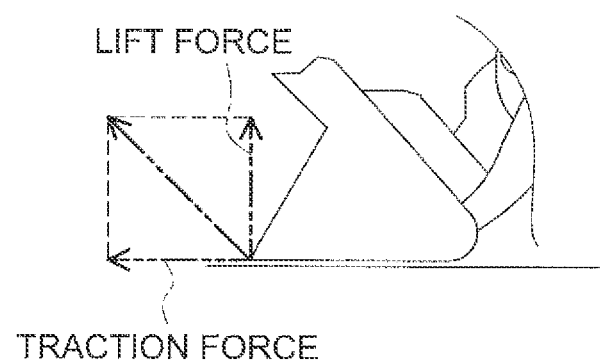
FIG. 14 is a view showing the relationship between the traction force and the lift force.
Figure 14:
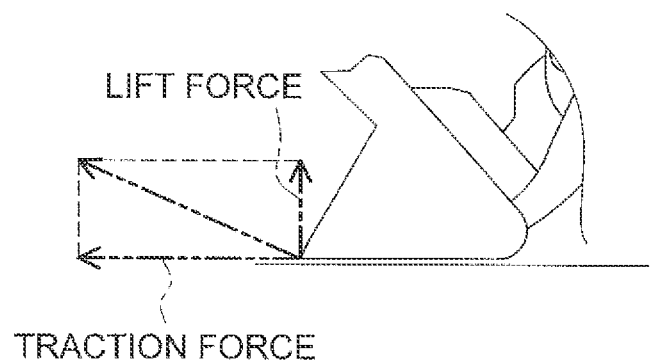

In the embodiment described above, the lift force is calculated on the basis of the hydraulic pressure of the work implement pump. However, the lift force may be calculated using another method. For example, the lift force may be obtained from a balance between a moment Mlr produced by a reaction force Flr to the lift force about the center P1 of rotational support of the boom 6 and the front vehicle body section 2a, a moment Mtr produced by a reaction force Ftr to the traction force, and a moment Mlc produced by an extension force Flc of the lift cylinders 14a and 14b, as shown in FIG. 13. Specifically, the magnitude of the lift force matches the magnitude of the reaction force to the lift force obtained by the following formula (4).

$$Flr=Mlr/(Lb\times\sin(Ab+90°))=(Mlc-Mtr)/(Lb\times\sin(Ab+90°)) \quad (4)$$

Lb is the length of the boom 6. Ab is the boom angle described above. In this case, for the sake of simplicity, the lift force is calculated having deemed that the reaction force Flr of the lift force and the reaction force Ftr of the traction force act on the center P2 of rotational support of the boom 6 and the bucket 7. However, the lift force can be more accurately calculated by regarding the reaction force Flr of the lift force and the reaction force Ftr of the traction force to act on the position P3 of the tip of the bucket 7 and giving consideration to the rotational angle of the bucket 7.

In the embodiment described above, the ratio of the traction force with respect to the lift force (=traction force/lift force) is used as the excavation force ratio, but it is also possible to use the ratio of the lift force with respect to the traction force (=lift force/traction force). In this case, a target traction force is calculated so that the excavation force ratio becomes greater than an execution threshold. In other words, the traction force is reduced when the excavation force ratio is less than the execution threshold. However, in this case, the change in the execution threshold Ra with respect to the operation amount of the boom operation member 83a is opposite from the change shown in the embodiment described above. In other words, the execution threshold Ra is increased as the operation amount of the boom operation member 83a is increased. Also, the execution threshold Ra is modified so as to decrease as the height position of the bucket 7 is increased in the case that the execution threshold Ra is modified in accordance with the height position of the bucket 7 as described above.

The embodiment described above has an effect in which it is possible to improve fuel consumption and to inhibit a reduction in ease of operation. Accordingly, the embodiment described above is useful as a work vehicle and a work vehicle control method.

The invention claimed is:

1. A work vehicle comprising:
   a drive source;
   a travel device configured to cause the work vehicle to travel by drive force from the drive source;
   a hydraulic pump driven by drive force from the drive source;
   a work implement driven by hydraulic fluid from the hydraulic pump;
   a traction force detector configured to detect traction force of the work vehicle;
   a lift force detector configured to detect a lift force for raising the work implement; and
   a controller configured to
      calculate a ratio of the traction force detected by the traction force detector with respect to the lift force detected by the lift force detector, or a ratio of the lift force detected by the lift force detector with respect to the traction force detected by the traction force detector,
      compare the calculated ratio to a prescribed threshold value, and
      execute traction force reduction control for reducing the traction force upon a first execution condition being satisfied, the first execution condition being satisfied when the calculated ratio of the traction force with respect to the lift force is larger than the predetermined threshold value, or when the calculated ratio of the lift force with respect to the traction force is smaller than the predetermined threshold value.

2. The work vehicle according to claim 1, further comprising:
   a work implement operation member configured to operate the work implement; and
   a work implement operation detector configured to detect an amount of operation of the work implement operation member,
   the controller being configured to change the predetermined threshold in accordance with the amount of operation of the work implement operation member.

3. The work vehicle according to claim 2, wherein
   the predetermined threshold is set so that the traction force decreases in correspondence with an increase in the amount of operation of the work implement operation member for raising the work implement.

4. The work vehicle according to claim 1, further comprising
a work implement attitude detector configured to detect an attitude of the work implement,
the controller being configured to change the predetermined threshold in accordance with the attitude of the work implement.

5. The work vehicle according to claim 4, wherein
the work implement attitude detector is configured to detect a height position of the work implement; and
the predetermined threshold is set so that the traction force increases in correspondence with an increase in the height position of the work implement.

6. The work vehicle according to claim 1, wherein
the controller is configured to determine whether a work phase of the work vehicle is excavation from a state of actuation of the travel device and the work implement; and
the controller is configured to execute the traction force reduction control upon the first execution condition and a second execution condition being satisfied, the second execution condition being satisfied when the work phase of the work vehicle is determined to be excavation.

7. The work vehicle according to claim 1, further comprising:
an accelerator operation member operated by an operator; and
an accelerator operation detector configured to detect an amount of operation of the accelerator operation member,
the controller being configured not to execute the traction force reduction control when the amount of operation of the accelerator operation member is less than a predetermined operation amount threshold.

8. The work vehicle according to claim 1, further comprising
a vehicle speed detector configured to detect a vehicle speed,
the controller being configured not to execute the traction force reduction control when the vehicle speed is greater than a predetermined speed threshold.

9. The work vehicle according to claim 1, further comprising
a height position detector configured to detect a height position of the work implement,
the controller being configured not to execute the traction force reduction control when the height position of the work implement is greater than a predetermined height threshold.

10. The work vehicle according to claim 1, wherein
the controller is configured to determine whether the hydraulic pump is in a stalled state, and, when the first execution condition and the second execution condition are satisfied, to reduce the traction force so that the traction force assumes a fixed target value that is less than a target value for when the traction force is not reduced.

11. The work vehicle according to claim 1, wherein
the controller is configured to determine whether the hydraulic pump is in a stalled state, and not to reduce the traction force when the hydraulic pump is not in the stalled state and the work implement operation member is in a non-operation state.

12. A method for controlling a work vehicle including a drive source, a travel device for causing the work vehicle to travel by a drive force from the drive source, a hydraulic pump driven by the drive force from the drive source, and a work implement driven by hydraulic fluid from the hydraulic pump, the method comprising:
detecting traction force of the work vehicle;
detecting a lift force for raising the work implement;
calculating a ratio of the traction force with respect to the lift force, or a ratio of the lift force with respect to the traction force;
comparing the calculated ratio to a prescribed threshold value; and
executing traction force reduction control for reducing traction force when the ratio of the traction force with respect to the lift force is larger than the predetermined threshold value or the ratio of the lift force with respect to the traction force is smaller than the predetermined threshold value.

* * * * *